(12) United States Patent
Barnard et al.

(10) Patent No.: US 7,231,555 B2
(45) Date of Patent: *Jun. 12, 2007

(54) METHOD AND APPARATUS TO COORDINATE GROUPS OF HETEROGENEOUS MEASUREMENTS

(75) Inventors: David L. Barnard, Sunnyvale, CA (US); Robert H. Kroboth, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 10/225,126

(22) Filed: Aug. 22, 2002

(65) Prior Publication Data

US 2004/0039970 A1    Feb. 26, 2004

(51) Int. Cl.
*G06F 11/00* (2006.01)
(52) U.S. Cl. .............................. 714/47; 714/4; 714/57; 702/118; 702/127
(58) Field of Classification Search .............. 714/4, 714/57, 47; 701/118; 709/223, 224; 713/400, 713/600; 702/118, 127
See application file for complete search history.

(56) References Cited

U.S. PATENT DOCUMENTS

| | | | | |
|---|---|---|---|---|
| 5,729,661 A | * | 3/1998 | Keeler et al. .................. | 706/16 |
| 6,421,571 B1 | * | 7/2002 | Spriggs et al. ................. | 700/17 |
| 6,539,446 B1 | * | 3/2003 | Chan ........................... | 710/200 |
| 6,671,291 B1 | * | 12/2003 | Soliman ....................... | 370/503 |
| 6,728,877 B2 | * | 4/2004 | Mackin et al. ............... | 713/100 |
| 6,826,507 B2 | * | 11/2004 | Kroboth et al. ............. | 702/127 |
| 6,832,326 B2 | * | 12/2004 | Kubo et al. .................. | 713/400 |
| 7,003,564 B2 | * | 2/2006 | Greuel et al. ................ | 709/224 |
| 2003/0046426 A1 | * | 3/2003 | Nguyen ....................... | 709/242 |

OTHER PUBLICATIONS

"A Remote Access Service (RAS) Client Class", Zhang, Qing, Feb. 9, 1999.*

* cited by examiner

*Primary Examiner*—Robert W. Beausoliel
*Assistant Examiner*—Emerson Puente

(57) ABSTRACT

A Network Troubleshooting Center NTC that performs orchestrated tests composed of heterogeneous measurements. The system within the NTC includes architecture to manage tests in accordance with requirements imposed by data provided. The NTC includes the operations of defining the test to be performed, configuring the settings according to the protocols used to provide data, locking specific resources dedicated to the particular test being performed, and running the tests on heterogeneous measurements in an orchestrated manner to provide a spectrum of results so that troubleshooting of the heterogeneous results can be performed at any desired level and summarized together.

47 Claims, 10 Drawing Sheets

METHOD AND APPARATUS TO COORDINATE GROUPS OF HETEROGENEOUS MEASUREMENTS

BACKGROUND OF THE INVENTION

1. Field of the Invention

The present invention relates to coordinating groups of measurements, and more specifically, coordinating heterogeneous measurements from different sources and measurements of the same type from different sources.

2. Description of the Related Art

Software platforms need to be able to collect measurements from data sources providing data in different forms, for example, different types of data, data accessible on different time tables, etc. Some examples of the data sources (protocols, including schemas explaining how data is formatted and organized) providing data to be aggregated and/or coordinated include, for example, routers, voice testers, network analyzers or network probes. The protocols implemented by the data sources include, but are not limited to SNMP (RMON, MIB2, etc.), RTP, XML, SCPI, http, CMIP, LDAP, ODBC, JDBC, etc. These measurements are usually used in a very individual way to troubleshoot specific problems within a single network, such as measurements provided by SNMP Agents. Such troubleshooting includes tests including taking and presenting individual measurements that highlight deviations from expected results. An example of a prevalent system that provides reports on a variety of measurements in a particular domain, such as measurements provided by SNMP Agents, is one by CONCORD COMMUNICATIONS.

However, more recently, there has surfaced a need to perform distributed testing, since many of the problems arising with networks requiring troubleshooting are difficult to pinpoint by individual measurements. Thus, a need exists to be able to coordinate multiple measurements at different places in the network at the same time. Moreover, in order to supplement some of the measurements taken with some products, there is need to include other measurements in an overall test taken by different network equipment, network applications, and network operating systems, that reside on a network at some point. Accordingly, there is a need to be able to tie different types of testing activity together. For example, to be able to schedule and trigger different measurements in concert, and to configure these measurements so that they all get the proper configuration with respect to running the different measurements. Further, there is a need to collect these results of the widely different types of data into a consolidated form in a database. Finally, there is a need to be able to highlight the most important violations or deviations from expectations of measurement results as well as to summarize and present the results of the different measurements together. Accordingly, there is a need for a software platform that can aggregate and/or coordinate different data into a common source.

SUMMARY OF THE INVENTION

It is an aspect of the present invention to provide a platform defining measurements to be taken on a network, configuring settings of devices on the network from which heterogeneous data will be provided to perform the measurements, locking the setting-configured devices to dedicate the devices to provide the heterogeneous data, and running tests to take the heterogeneous measurements from the locked devices.

It is another aspect of the present invention to provide a method of orchestrating groups of heterogeneous measurements and/or measurements of the same type of data from data sources.

It is yet another aspect of the present invention to provide a framework common to a plurality of devices on a network, the framework automatically synchronizing heterogeneous measurements taken from the plurality of devices over the network.

It is yet another aspect of the present invention to provide a computer implemented data collector common to a plurality of devices on a network, the data collector automatically gathering heterogeneous measurements from the plurality of devices over the network.

It is yet another aspect of the present invention to provide an apparatus having: a common framework to correlate measurements obtained from different devices, at least two of the devices providing data of a different type by synchronizing the measurements obtained from the different devices.

It is yet another aspect of the present invention to provide a computer-implemented presentation device which correlates heterogeneous measurements taken from a plurality of devices on a network, presents the correlated heterogeneous measurements on a display screen to an end user, and allows the end user to drill from a less detailed presentation to a more detailed presentation.

It is yet another aspect of the present invention to provide a method of integrating heterogeneous measurements received from plural data sources in a common network, the method including the operations of: (a) defining each of the measurements to be taken with the service of at least one data source; (b) configuring settings of each of the data sources involved in the measurements to be taken; (c) locking resources dedicated to each specific measurement to be taken; (d) performing measurements on the data received from the data sources; (e) synchronizing the heterogeneous measurements taken; and (f) presenting the measurements together.

It is yet another aspect of the present invention to provide a method of coordinating groups of heterogeneous measurements in a common platform, the method including the operations of: providing plural data sources, each data source containing a different type of data with respect to another data source; measuring the different types of data from the plural data sources; and normalizing the measured results on a common scale.

It is yet another aspect of the present invention to provide a network troubleshooting system having: at least two data sources, each data source providing data of a different type with respect to another data source to be measured; a data source manager providing management of how the different types of data are to be measured; a data collector providing information necessary for the network troubleshooting system to measure the different types of data provided by the at least two data sources; a database to store the measurements taken; and a test manager to manage performance of the measurements on the different types of data provided by the at least two data sources.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
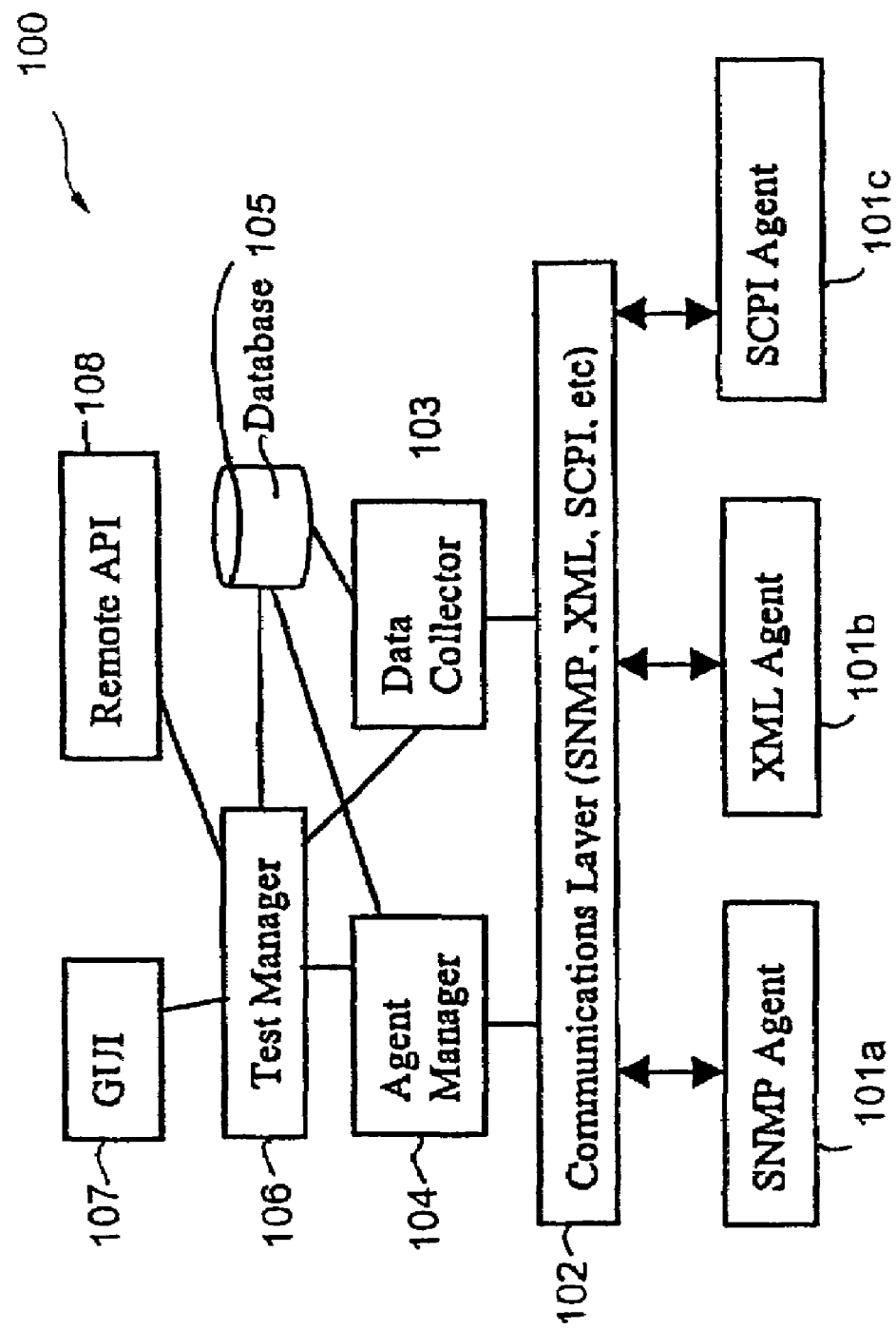
FIG. 1 illustrates an example of the Network Troubleshooting Center (NTC) architecture according to an embodiment of the present invention.

Reference will now be made in detail to the embodiments of the present invention, examples of which are illustrated in the accompanying drawings, wherein like reference numerals refer to like elements throughout.

Different types of network systems are usually implemented by a vast range of different protocols, i.e., SNMP (RMON, MIB2, etc.), RTP, XML, SCPI, http, CMIP, LDAP, ODBC, JDBC, etc. Accordingly, the data provided by these protocols are heterogeneous with respect to each other. The present invention provides for an operating system and method of collecting the heterogeneous data from each of the separate protocols, synchronizing the heterogeneous data to perform orchestrated tests, and presenting a normalized result of the tests while providing the ability to view the results in an interactively navigatable manner.

FIG. 1 is a diagram illustrating an example of the Network Troubleshooting Center (NTC) 100 (also referred to as a platform) architecture according to an embodiment of the present invention. This NTC is illustrated as being able to collect data from many different data sources or network hosts (also referred to as Agents) and perform synchronized tests on the data.

There are three Agents 101a-101c provided in FIG. 1 for illustrative purposes hosting three commonly used protocols. However, it is to be understood that many additional as well as different Agents 101a-n, hosting many different types of protocols, may be used to provide data to the Network Troubleshooting Center 100 of the present invention (see FIGS. 2 and 3 described infra). Some other types of protocols hosted by the Agents 101a-n include, for example, SNMP, XML, SCPI, SNMP (RMON, MIB2, etc.), XML, NSTP, RTP, http, CMIP, LDAP, ODBC, JDBC, etc. It is to be noted that this extended list of protocols that can be implemented by the NTC 100 of the present invention are not limited thereto, but are only provided as illustrative examples of the many standard or proprietary protocols that may be implemented by the NTC 100 of the present invention. A Communications Layer 102 is used to communicate the different protocols supporting the NTC 100 with the NTC 100 itself. For example, the Communications Layer 102 provides the different measurement data (heterogeneous with respect to each other) received from the different Agents 101a-n to be collected by a Data Collector 103.

The Data Collector 103 collects heterogeneous measurements provided by each of the Agents 101a-n implemented by the NTC 100 (also referred to as a common platform). The measurements taken may include active measurements, passive measurements, absolute measurements, differential measurements, discrete measurements, continuous measurements and progressive measurements. It is to be noted that although a single Data Collector 103 is provided for illustrative purposes only, it is to be understood that a plurality of Data Collectors may be used with the NTC 100 of the present invention.

Active testing involves measuring the response to some stimulus generated as part of the measurement setup. Some examples include a PSQM voice quality measurement, ping and traceroute, and active application response time. Passive testing involves observing network (or system) activity with minimal influence to the environment under test. Some examples include packet capture, SNMP RMON and MIB statistics, and RTP quality measurements. Whether the measurement is active or passive is important with respect to the use cases. For example, active measurements sometimes require taking communications equipment offline or degrading its capacity.

Absolute measurements include those that are made up of independent observations. On the other hand, other measurements require factoring together other observations to calculate an independent result. For example, differential measurements require subtracting one observation from another to obtain a result. An example of a differential measurement is a counter, which is a common feature of SNMP MIBs. One such counter is the in-octets counter on an MIB2 interface. The value of the counter, by itself, is not very useful since it has no deterministic reference. A measurement in this case is based on two readings of the counter, separated in time.

Some measurements are naturally repetitive while others are not. For example, measuring SNMP statistics easily lends itself to periodic, or intervalized, measurements. In this case, the measurement is an intervalized data collection, containing one or more time intervals. Other measurements are discrete, or single shot, in nature, such as the time duration of a voice call. Measurements such as voice quality and ping can be used either way. For intervalized measurements, producing a small result set is usually important. An important approach in intervalized measurements is to obtain vital statistics, those that provide the best summary of the underlying condition. Thus, when running a PSQM measurement repetitively, the measurement results would record less detail, and when running single-shot, it would record more detail.

A progressive measurement is one that produces a series of intermediate results along the way to completion. This is different from a continuous measurement in that each intermediate result set may be different. An example is a trace route. This idea also applies to phased measurement processes, such as certain voice measurements that involve call setup and tear down. For these kinds of tests, it is often useful to provide partial results to the user as the test unfolds, depending on how often intermediate results become available.

In the present invention, various mechanisms may be employed to communicate between the test agent to communicate status, progress updates, and test results. In some cases the agent must be polled. In other cases it may provide asynchronous notification through SNMP traps or other mechanisms. For network trouble-shooting analyzers, such as the AGILENT Network Analyzer of the present invention, a proprietary XML API may be used.

Figure 2:
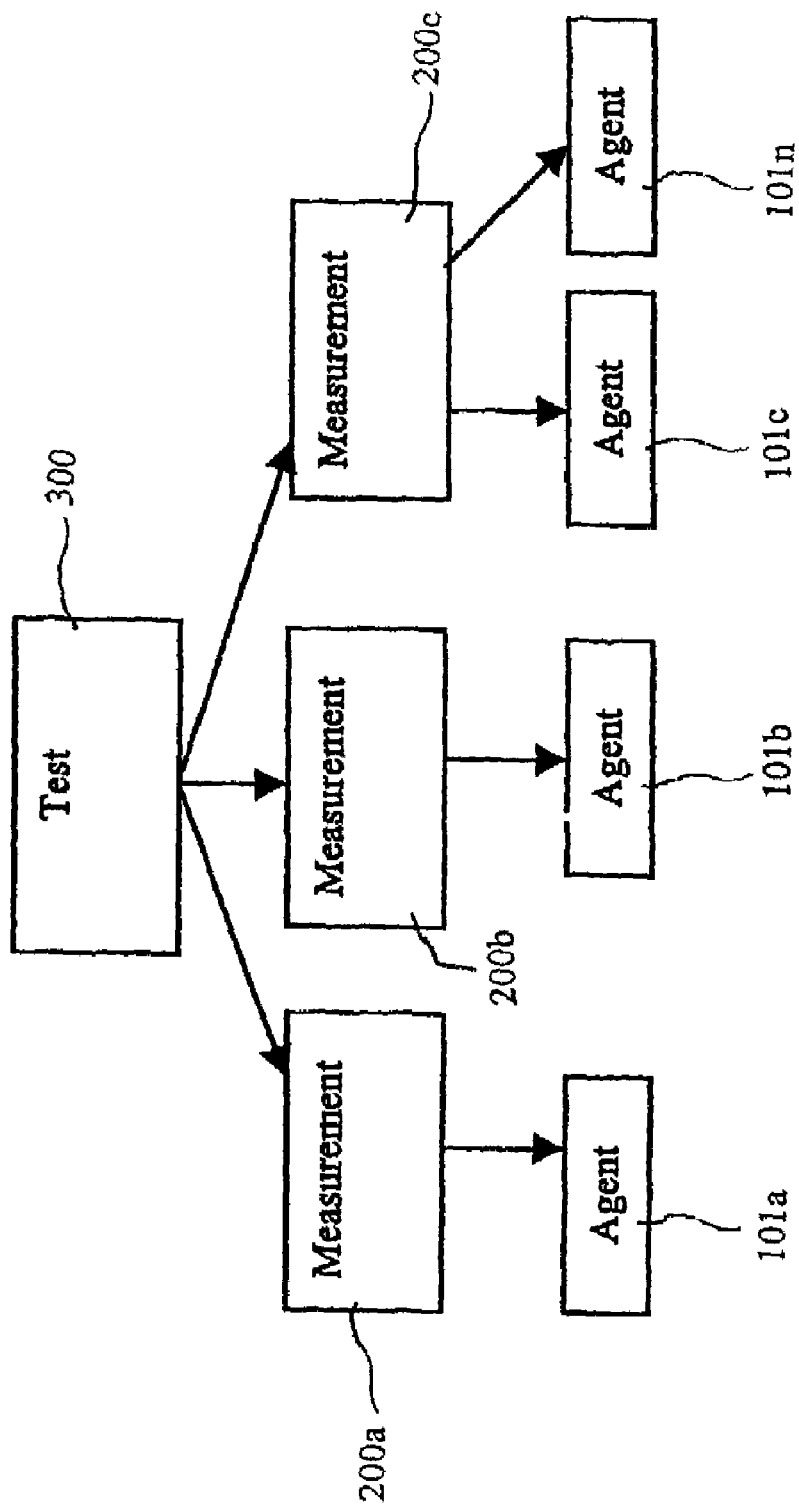
FIG. 2 illustrates a general representation of components of a test using the NTC according to an embodiment of the present invention.

FIG. 2 illustrates a general representation of the components of a test 300 using the NTC 100 (or common platform) of the present invention. As stated above, the Agents 101a-n are data sources (also referred to as data providing devices) hosting a variation of protocols to be supported by the NTC 100 of the present invention. The NTC 100 can implement a multiple number of Agents 101a-101n from which it receives data to take measurements thereof at operations 200a-200c. It is to be noted that the number of measurement operations in FIG. 2 are provided of illustration purposes only, but may be as extensive as the number of Agents 101a-n implemented by the NTC 100 of the present invention. Each Agent 101, or sometimes a group of Agents together (101c-101n), can provide measurement data. Each measurement provides an independent set of results, which may allow an opportunity for correlation with other measurement results. A measurement may consist of raw observational data or the results of a lower level test, perhaps filtered or summarized. Generally, once the data is measured, synchronized testing can be performed. However, specific operations are set up prior to actual testing, as will be described in detail infra.

Figure 3:
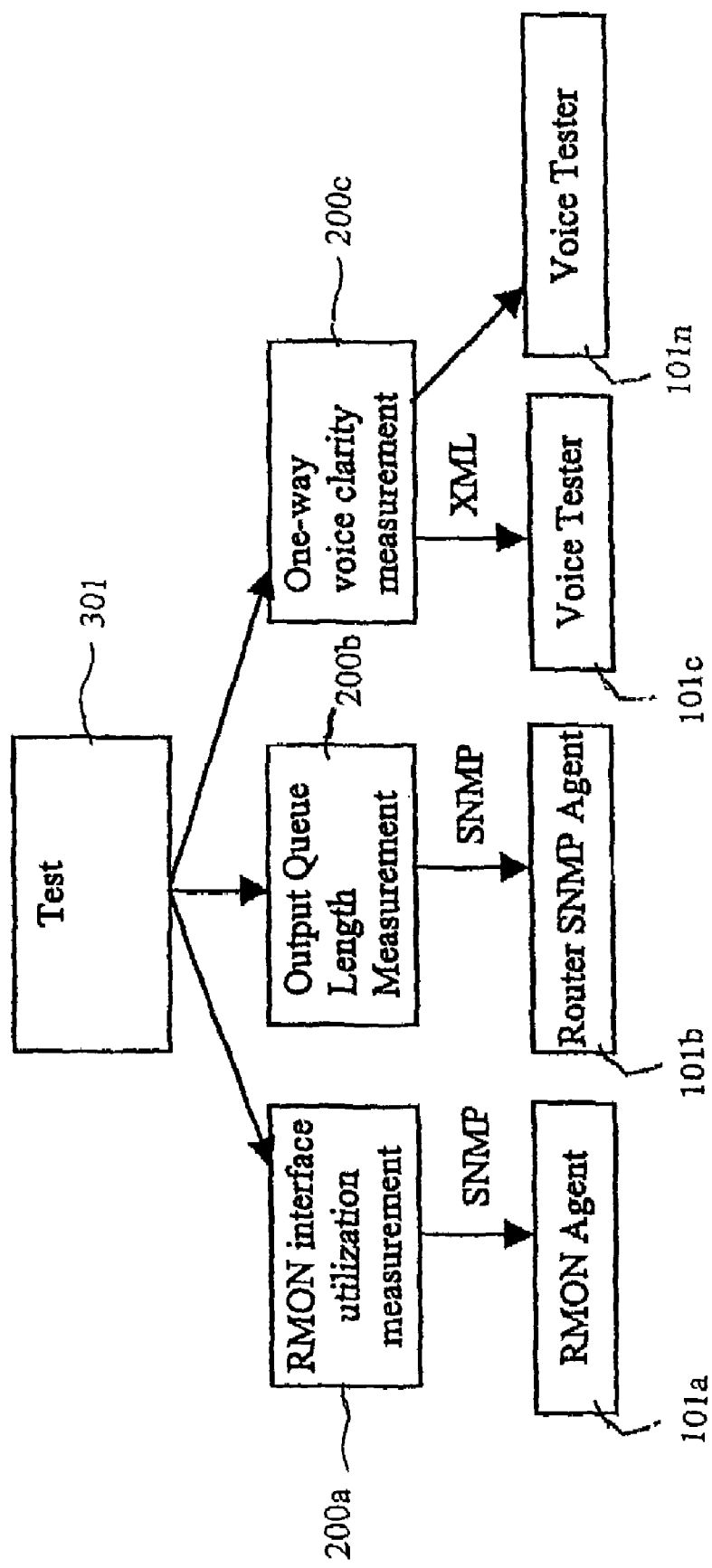
FIG. 3 illustrates an example of a test using the NTC according to an embodiment of the present invention.

FIG. 3 illustrates a more detailed example of a test 301 performed by the NTC 100 of the present invention, wherein the test 301 here is composed of taking heterogeneous measurements at operations 200a-200c. This heterogeneous test 301 may be used to troubleshoot a voice-over-IP performance problem. An end-to-end measurement of voice clarity is one of the measurements taken at operation 200c. Also illustrated are two measurements of network statistics for network equipment that the voice-over-IP call traverses. Accordingly, the Agents 101a-n illustrated in FIG. 3 host protocols including RMON, SNMP, and two voice testers. As stated above, these protocols are provided for illustrative purposes only, and may be substituted for other protocols to be implemented by the NTC 100 of the present invention. Troubleshooting the problem requires being able to correlate the results of the individual measurements taken at operations 200a-200c as part of the test results presentation, which is performed by the NTC 100 of the present invention.

As illustrated in FIG. 1, a Test Manager 106 provides management of how the tests are to be performed. Stated differently, the Test Manager 106 determines how to orchestrate the tests performed between the different measurements to be taken. For example, a test orchestrator (not shown), which is part of the Test Manager 106, invokes each Agent's test manager interface (domain specific test plug-ins, which may be implemented as part of an Agent Manager), such as, for example, MIB2, RMON, VQT, that is aware of how to package the resulting document to contain the elements that are useful for summarizing the test in question. This relieves the Test Reporter and Test Orchestrator from having to be programmed with any domain specific knowledge.

An Agent Manager 104 provides management of how data is to be measured. The Agent Manager 104 and the Data Collector 103 are basically two units that have specific knowledge of what needs to be supplied for the measurements.

The test of measurements to be performed must be defined. For example, the test is composed of one or more measurements. These measurements may be of the same kind or heterogeneous. Selection of the measurement to be taken may be determined by a GUI 107. Alternatively, the selection of the measurement to be taken may be determined by an automated process using an API 108. Everything about the measurement to be taken generally is defined before the test is run. Alternatively, the measurement parameters may be changed during the course of the test or tests being performed.

Once the type of test and all of the details about the test are defined, configuration settings for each measurement to be taken must also be provided. These configuration settings are measurement specific and usually are provided by some type of data entry. The GUI 107 may guide a user to apply user-specified settings by enumerating to the user through each measurement to apply the configuration settings. Alternatively, a configuration setting may be applied through the API 108 by an automated process. Once the necessary configuration settings have been provided, the test is ready to be run. Some examples of configurations to be set include, for example, what is being measured, how end results are desired, etc. Another example of configuration settings needed are ones involving measurements to be taken regarding voice over IP phone calls. Here, if measurements of the number of calls to a specific number are required, the number itself could be a configuration setting. Another example could be if voice quality is desired to be determined, configuration settings could be set to implement a method among several different methods of measuring that voice quality.

Another part of the configuration setting is an autonomous portion of the configuration where the Test Manager 106 pushes the configuration settings into the Agents 101 at measurement run time. There is decoupling between the user specifying the measurement configuration setting and the pushing out of the configuration information into the respective measuring Agents 101a-n. The Test Manager 106 performs this decoupling.

In addition to the configuration settings obtained before running the tests, new configuration settings provided while tests are being performed may be entered into the NTC 100 through the GUI 107 or the API 108. For example, a Javabean may be implemented with the GUI 107 to provide new configuration settings to the NTC 100 (common platform) of the present invention.

Any measurement to be taken may have resources that need to be dedicated thereto exclusively for the duration of a measurement. In order to coordinate resource usage given that more than one test may be running, certain resources that are dedicated to any particular test may be locked to the test, otherwise referred to as "locking resources." Thus, when a test is started, the test may be locked on a necessary resource(s) to perform the test or measurement. The lock(s) are released once the test is completed or when the test being performed no longer needs the resource(s). The Test Manager 106 receives and uses specific information provided to it in order to perform any necessary locking of resources to particular tests. The locking of resources is performed before the test is run.

Once the test begins, different types of measurements may be performed, as described supra. For example, discrete measurements (triggered), continuous measurements, progressive measurements, etc., may be taken. A trigger may start the test, or maybe a discontinuous test may be performed. In continuous measurements, the Test Manager 106 may not be needed to the extent that it is needed in other measurements. However, the Test Manager 106 must be able to support the different types of measurements. For example, the Test Manager 106 needs to know whether it starts the test or whether it can count on the measurements already taking place. Therefore, this information, commonly referred to as meta-knowledge, may be placed into the Test Manager 106 by the Agent manager 104 and/or the Data Collector 103 so that each scenario (different types of tests to be taken) is supported. As stated previously, the Agent Manager 104 and the Data Collector 103 are basically the two units that have specific meta-knowledge of what needs to be supplied for performing the different measurements, and the Agent Manager 104 and the Data Collector 103 provide important data to the Test Manager 106 so that it is capable of supporting different types of measurements.

Time synchronization of the measurements taken by the NTC 100 according to an embodiment of the present invention is necessary for orchestrated test management. Time synchronization of the measurements observed may be performed by the NTC 100 in many different ways. Regarding SNMP measurements, for example, the Data collector 103 usually time stamps the data by taking an absolute time, but it also keeps a relative time as to when a measurement observation has occurred based on "system time ticks." The system time ticks are usually relative to some arbitrary starting point. The management system can obtain an absolute time stamp by comparing a current time to the current time system tick value and then scales this into absolute time. Then all of the system time ticks associated with the observations are relative to data clock in the data collecting system.

The NTC 100, according to an embodiment of the present invention, is capable of implementing many different types of Agents 101 hosting different types of protocols, which are listed supra. Further, the types of Agents 101 that can be implemented by the NTC 100 of the present invention, as listed supra, and the protocols that can be hosted by these different types of Agents 101, are provided for illustration purposes only, and are not limited thereto.

Different Agents 101 are known to have different time synchronization techniques for providing data. With the NTC 100 according to an embodiment of the present invention, each of these time synchronization techniques adopted by the different Agents 101 to be used with the NTC 100 can be implemented therein and synchronized together. Examples of the Agents that can be used together with the NTC 100 of the present invention are provided below for illustration purposes only, and are not to be limited thereto.

Some Agents 101 are capable of performing their own "time stamping" through time system protocols such as, for example, NTP. This technique is supported by the NTC for providing synchronization of distributed measurements. Another type of time synchronization provided by Agents includes having a "common clock" that is distributed to a group of agents, and is known as "Clock Distribution." Here the measurements within the Agents are synchronized to the common clock. The management station is synchronized to the common clock so that absolute time can be obtained. Another type of time synchronization supported by the NTC system 100 of the present invention involves "discrete data collection." Here an observation point is collected and compared to the system clock, such that there is control over when the reading is taken. Other Agents that can be implemented with the NTC 100 of the present invention have their own system clock that can be periodically adjusted to keep it relatively accurate with respect to the system clock. Where the Agent has an active synchronization protocol, such as an NTP protocol, the NTC system 100 of the present invention uses this method of time synchronization. Some of the more prevalent time synchronization techniques that can be implemented with the NTC 100 of the present invention have been listed above for illustrative purposes only, however, many other time synchronization techniques may be implemented with the NTC 100 of the present invention, such as, for example, Absolute Time Synchronization (important for server to server and agent to agent data correlation), "GPS," "Internal Time Bases" (the most extreme physical layer measurements, involving clocks used in synchronous network requiring laboratory grade precision internal time bases), "Synchronization Through management Station Polling" (where the managing station provides data synchronization by performing measurement observations at polled intervals), etc.

Figure 4:
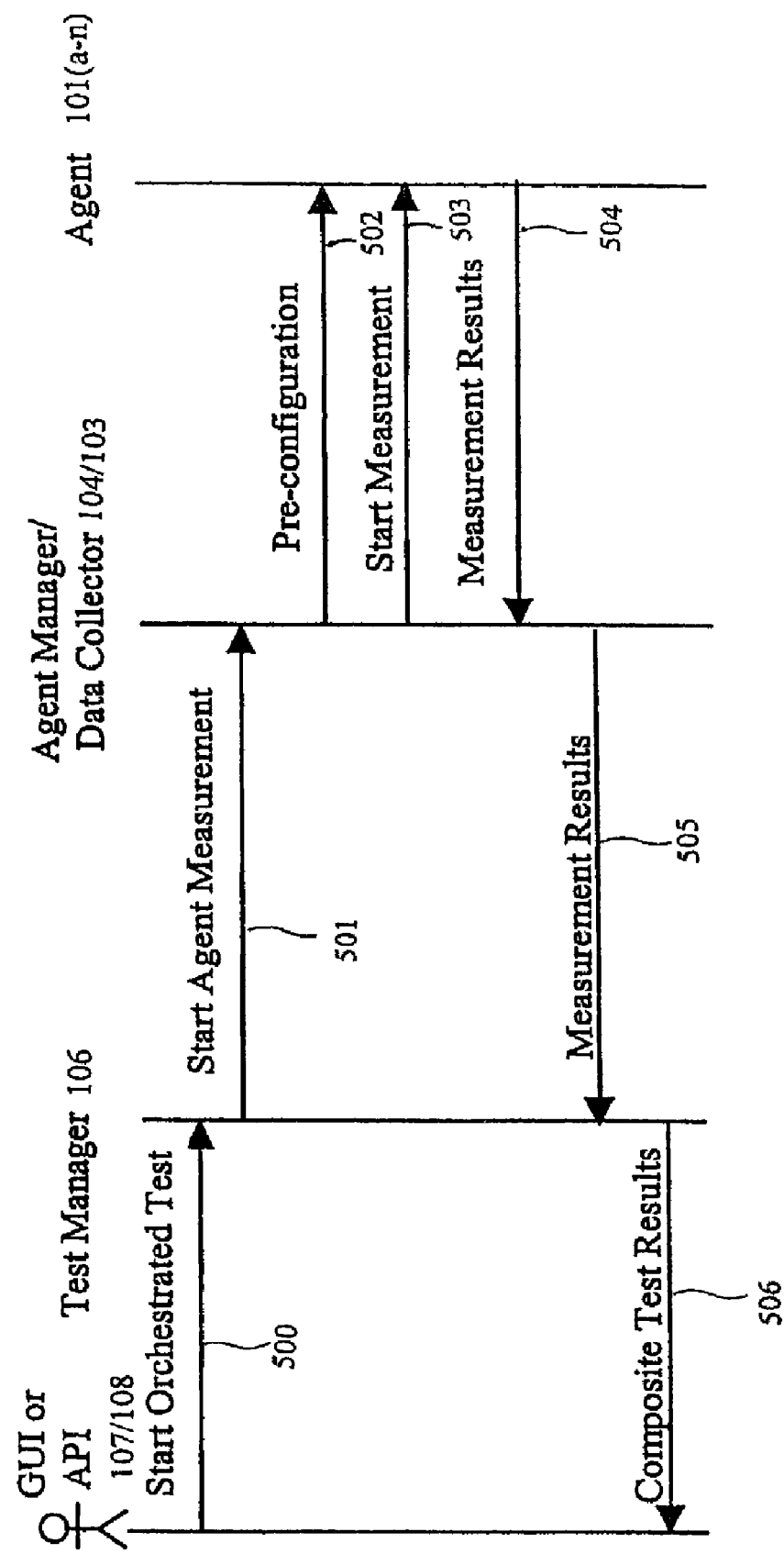
FIG. 4 illustrates a test composed of a single discrete measurement performed by the Network Troubleshooting Center according to an embodiment of the present invention.
Figure 5:
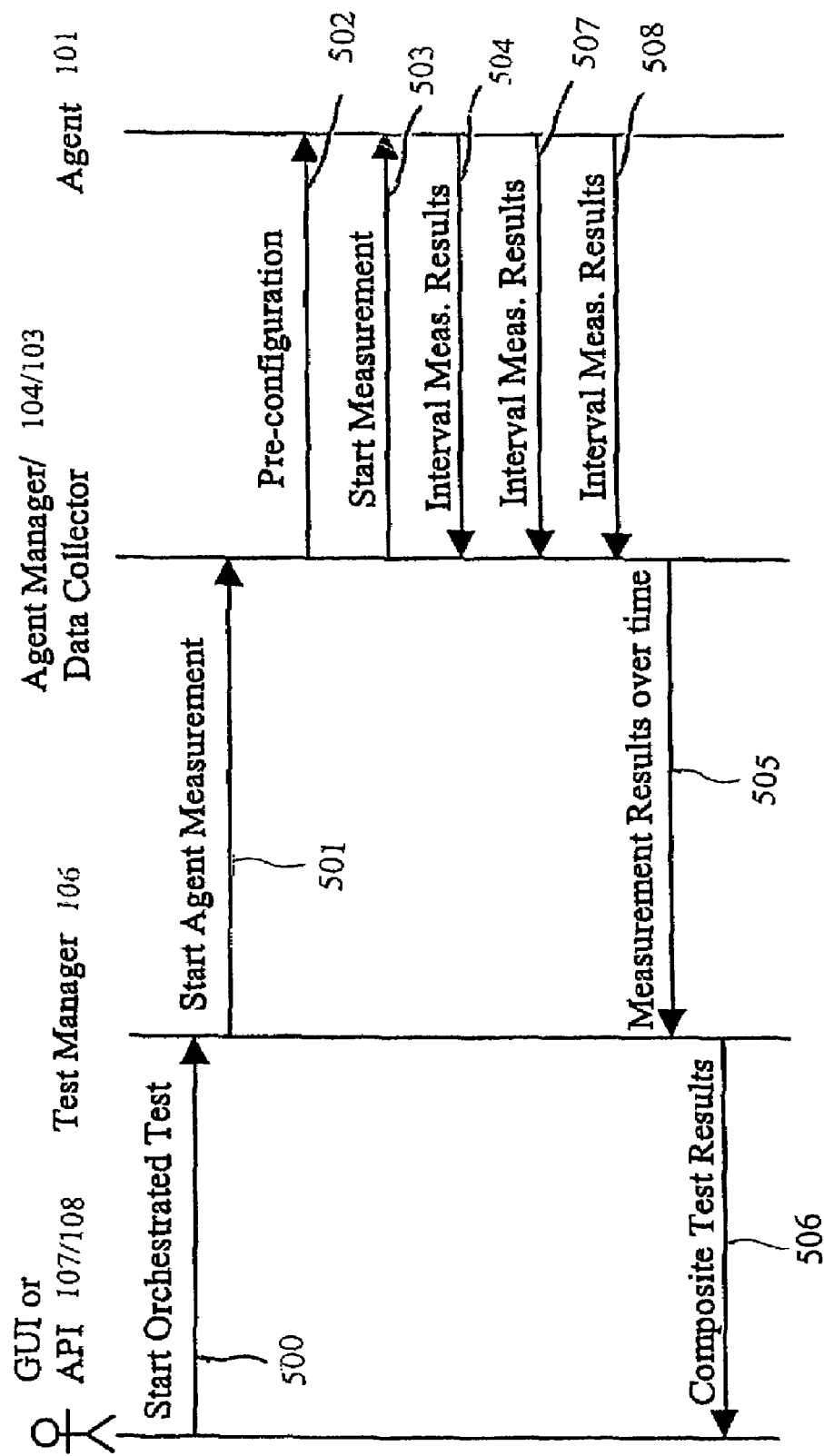
FIG. 5 illustrates a test composed of a single intervalized measurement performed by the Network Troubleshooting Center according to an embodiment of the present invention.
Figure 6:
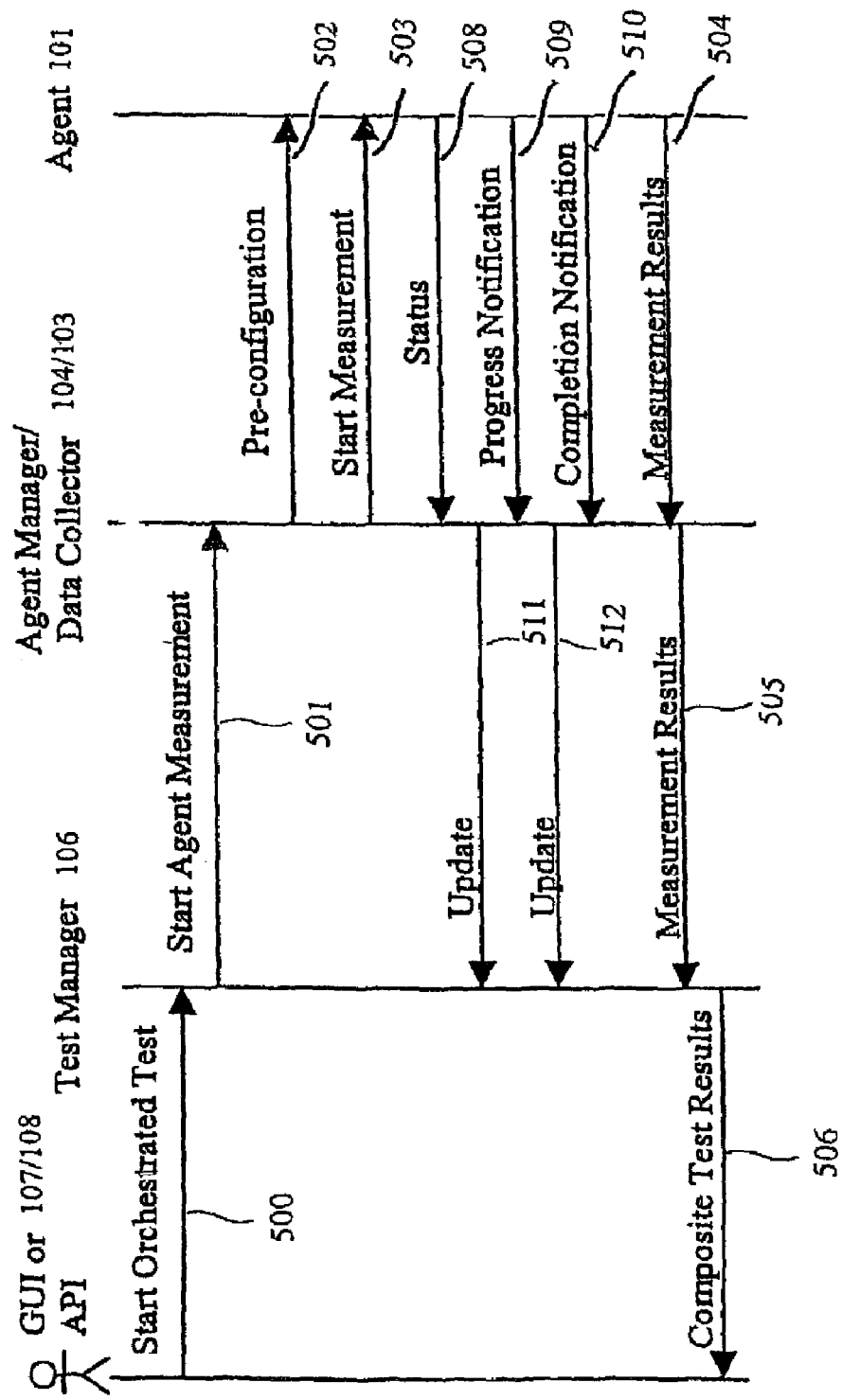
FIG. 6 illustrates a test composed of a single progressive measurement performed by the Network Troubleshooting Center according to an embodiment of the present invention.

FIGS. 4-6 illustrate sequence diagrams for the types of measurements described above under the control of a Test Manager 106. It is to be noted that these tests performed by the NTC 100 of the present invention as provided in FIGS. 4-6 are for illustration purposes only, and the different orchestrated tests that can be performed by the NTC 100 of the present invention is not limited thereto.

FIG. 4 illustrates a test composed of a single discrete measurement. Here an orchestrated test is started at operation 23 by either input from a user (at the GUI 107) or by an automated process (at the API 108). Then the Test Manager 106 instructs the orchestrated performance of the Agent measurement at operation 501, including which Agent will be implemented at a given time. Then the Agent Manager 104 provides specific information (meta-knowledge) on the management of the data to be measured, including pre-configuration setting information 502 and instructions to start the measurement 503. Once the meta-knowledge is provided by the Agent Manager 104, the Agent 101 provides the measurement. Then the Data Collector 103 receives the measurement results 504 and forwards the results 505 to the Test Manager for presentation or storage 29 at the GUI 107 or API 108.

FIG. 5 illustrates a more involved test composed of single intervalized measurements. Here, as performed in FIG. 4, an orchestrated test is started at operation 23 by either input from a user (at the GUI 107) or by an automated process (at the API 108). Then the Test Manager 106 instructs the orchestrated performance of the Agent measurement at operation 501, including which Agent will be implemented to provide the data to be measured at that time. Then the Agent Manager 104 provides specific information (meta-knowledge) on the management of the data to be measured, including pre-configuration setting information 502 and instructions to start the measurement 503. Once the meta-knowledge is provided by the Agent Manager 104, the Agent 101 provides the measurement at operation 504 to the Data Collector. The Data Collector 103 receives the measurement results at operation 504, and then again at several more intervals, i.e., operations 507 and 508, and then forwards the results collected over time at operation 505 to the Test Manager 106, which then forwards the results for presentation or storage to either the GUI 107 or the API 108 at operation 29.

FIG. 6 illustrates a test composed of a single progressive measurement. Here, an above, an orchestrated test is started at operation 23 by either input from a user (at the GUI 107)

or by an automated process (at the API 108). Then the Test Manager 106 instructs the orchestrated performance of the Agent measurement at operation 501, including which Agent will be implemented to provide the data to be measured at that time. Then the Agent Manager 104 provides specific information (meta-knowledge) on the management of the data to be measured, including pre-configuration setting information at operation 502 as well as instructions to start the measurement at operation 503. Once the meta-knowledge is provided by the Agent Manager 104, the Agent 101 provides the measurement. Then the Data Collector 103 receives the measurement result at operation 504 and then forwards it to the Test Manager 106 at operation 505. Then, the Agent 101 checks the status of the measurement at operation 508, provides any progress of the measurement at operation 32, and provides notification to the Data Collector 103 when the progress of the measurement is complete at operation 510. Each time the Agent 101 provides an update (progress) of the measurement, the Data Collector 103 sends the updated measurement result to the Test Manager, i.e., operations 511 and 512. Once the test is complete, the composite measurement results are provided to either the GUI 107 or API 108 at operation 29 for such operations as presentation, etc.

Once the tests have been performed, as stated above, the results are stored in one or more databases 105. Some of the databases 105 that can be implemented with the NTC 100 include a relational database and/or an XML. Since the individual measurement results can vary widely, plural databases may be required. For example, to store the results of a list containing host names, network addresses, protocol names, numerical data, etc., either a flat file storage or XML may be implemented rather than a relational database. Another example of implementing XML or flat file storage may be in the case when storing the results of a packet capture dump.

The NTC 100 (common platform) then performs the operation of summarizing the results of the test containing multiple heterogeneous measurements. Once the results are summarized, a detailed presentation can be constructed and provided for viewing. The NTC 100 also implements a Presentation Device 400 to be described in more detail with reference to FIGS. 7-9.

One form of summarization of the test results includes aggregation. In an embodiment of the present invention, the NTC 100 uses a mechanism called an RYG (red-yellow-green) transform, which is applied to SNMP data, and illustrated in formula 1 below.

$y = f(x)$ where $y = 3.0$ where $x >= Cmax$ $y = 2.0 + (x - Tyr)/(Cmax - Tyr)$ where $Cmax > x >= Tyr$ $Y = 1.0 + (x - Tgy)/(Tyr - Tgy)$ where $Tyr > x >= Tgy$ $Y = x/(Tgy - Cmin)$ where $Tgy > x >= Cmin$ $y = 0.0$ where $x < Cmin$  Formula (1)

Note: Although illustrated to apply to the positive case, this expression can be modified for the negative case (higher is better) or composite cases where there are multiple positive and negative ranges within the input function.

In the RYG transform, x is the input to the transform function, y is the output thereof, Cmin is a minimum constraint value, Cmax is a maximum constraint value, Tyr is the second threshold expressed in the same units as the x value, and Tgy is the first threshold expressed in the same units as the x value. The expression may be modified for the negative case, where higher x is better, or composite cases where there are multiple positive and negative ranges within the input function. Embodiments of the present invention are not limited to the RYG transform, as other functions for normalizing the data may be used.

Figure 10:
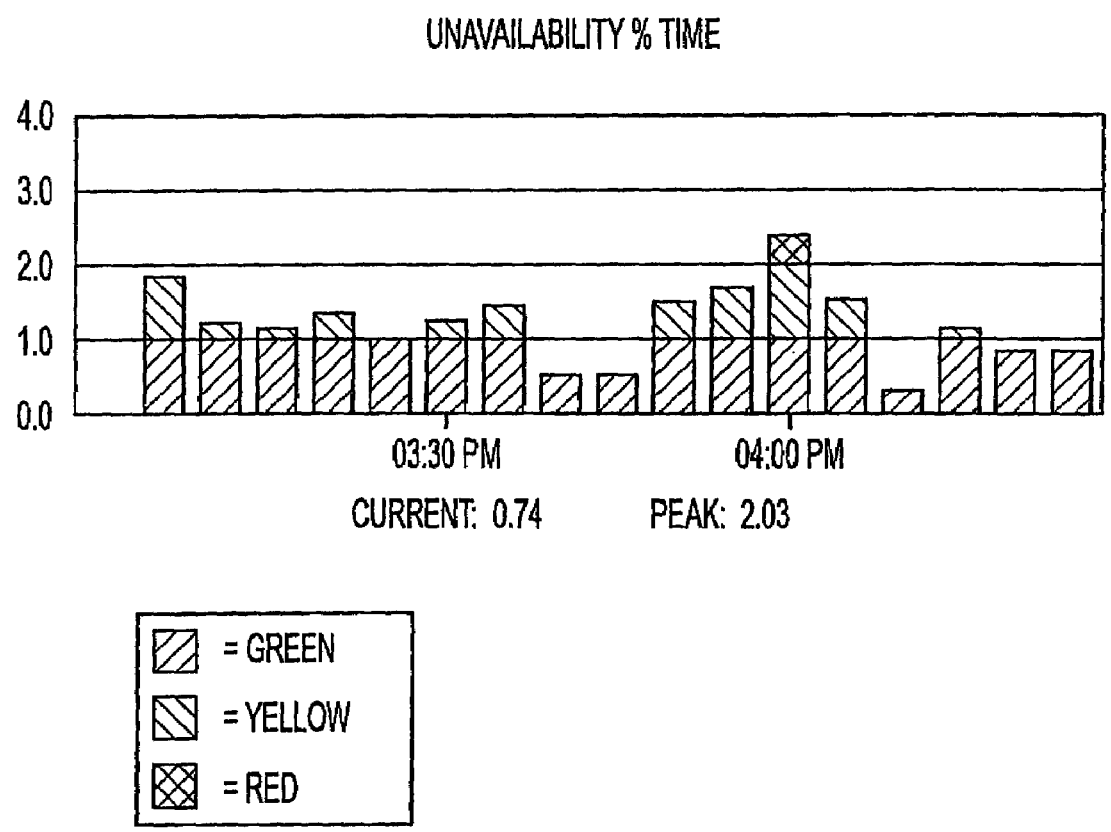
FIG. 10 illustrates a diagram of the display of normalized data in color, according to an embodiment of the present invention.

Within the test architecture, the RYG may be applied as follows. First, the key metrics or vital statistics that best characterize the measurement results at each observation point are identified. Then, the RYG transform is applied, using the appropriate thresholds, to generate a normalized result that maps to some point in the RYG continuum. FIG. 10 illustrates, for example, a graph of the percentage of time that a network element is unavailable while based on two thresholds. For example, the first threshold is normalized at 1.0 while the second threshold is normalized at 2.0. The green portion is the normal operation region; the yellow portion is the warning portion; and the red portion is the critical region. Within this normalized space, the key metrics can be combined, compared, aggregated, etc., regardless of scale or units. An example of the normalized data using the RYG transform is provided as follows. In normalized values in a continuum from 0.0 to 3.0, 0.0 would be the best reference value while 3.0 would be the worse reference value. For normalized data that is below a first threshold, i.e., a normalized value of 1.0, green may be used; for normalized data that is at or above the first threshold, i.e., the normalized value at 1.0, but below the second threshold, i.e., the normalized value at 2.0, yellow may be used; for normalized data that is at or above the second threshold, i.e., the normalized value at 2.0, red may be used. For a utilization measurement, the GY (green-yellow) might be 33% and the YR (yellow-red) might be 66%. Thus, 33% may be normalized to 1.0 on the continuum and 66% may be normalized to 2.0 on the continuum.

Embodiments of the present invention are not limited to the combination of red, yellow, and green. For example, any other color or color combination may be used. Embodiments of the present invention are not limited to particular colors for particular threshold ranges. For example, red or any other color may be used for normalized data below the first threshold, i.e., normalized at 1.0. Embodiments of the present invention are not limited to changing color when the normalized data equals a threshold. For example, normalized data may be displayed as green when at or below the first threshold, i.e., normalized at 1.0. Embodiments of the present invention are not limited to displaying normalized data in multiple colors per vertical display element. For example, in the leftmost vertical display element, the present invention could be configured to display normalized data that has not yet crossed the second threshold, i.e., normalized at 2.0, in one color instead of two. Embodiments of the present invention are not limited to a graph on X and Y axes using vertical display elements. For example, a color spreadsheet or scatter plot may be used. Embodiments of the present invention are not limited to displaying only one type and set of measurements at a time. For example, multiple graphs may be displayed on the same screen, each graph representing a different type and set of measurements, thresholds, etc. The normalization presentation can be broken into different levels, for example, having more intermediate bands other than RYG. An important concept here is that all desired points are defined at a point on a continuum. Everything can be mapped onto the normalized scale by using thresholds.

A number of techniques may be used to present the RYG results, some of which are described below.

It is to be noted that only a very general purpose data model can represent the many formats of measurement results that are available. As pointed out above, since only summary data needs to be part of the generalized representation, in another embodiment of the present invention, detailed data and data that requires specialized presentation will use a native user-interface and be made accessible through a context launch. This form of zoning in (navigating to a particular level) on different levels of test results is called "drilling," and is discussed in more detail below.

The type of data that is useful in a summary presentation is listed below:

1. One line test summary;
2. RYG Aggregation, using presentation such as at-a-glance charts and radar charts;
3. Correlation graphs and tables, including time axis correlation;
4. Summary values that could be part of a consolidated summary results table; and
5. Other summary data for graphs and tables that could be presented as intermediate drill downs from the summary page, and context launch information for association with drill down from the above four presentations.

Figure 7:
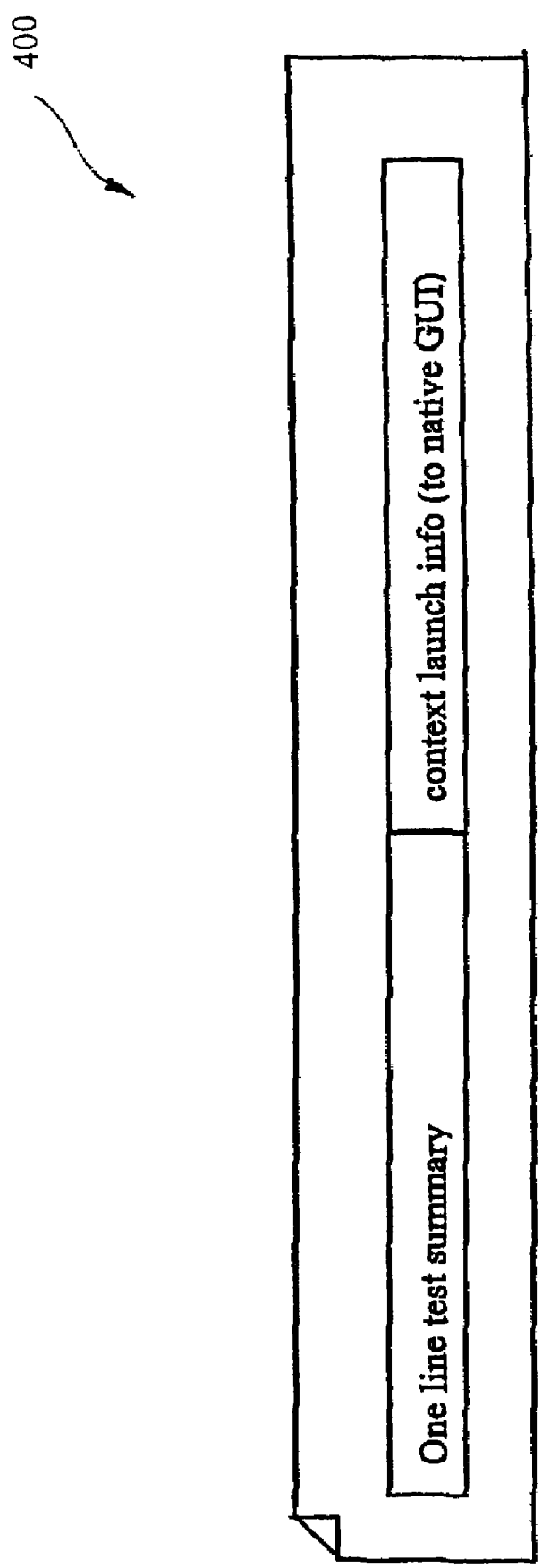
FIG. 7 illustrates an example of a simple XML test results document according to an embodiment of the present invention.

This approach could be easily accommodated by a simple object model, or alternatively, a simple XML document that would be sent from the Test Manager 106 to a Test Reporter 400 (i.e., a test results GUI screen/presentation device). The XML example is described next for illustrative purposes only. The Test Reporter 400 (also referred to as a presentation device) simply assembles the pieces from each orchestrated test and builds an illustrative presentation thereof on a summary page (see FIG. 7). This provides for a phased approach that is very extensible for implementing future requirements. As illustrated in FIG. 7, the first phase provided on the presentation device 400 simply includes the one line test summary and context launch information. Other pieces can be added incrementally, as illustrated on the presentation device 400 in FIG. 8.

Figure 8:
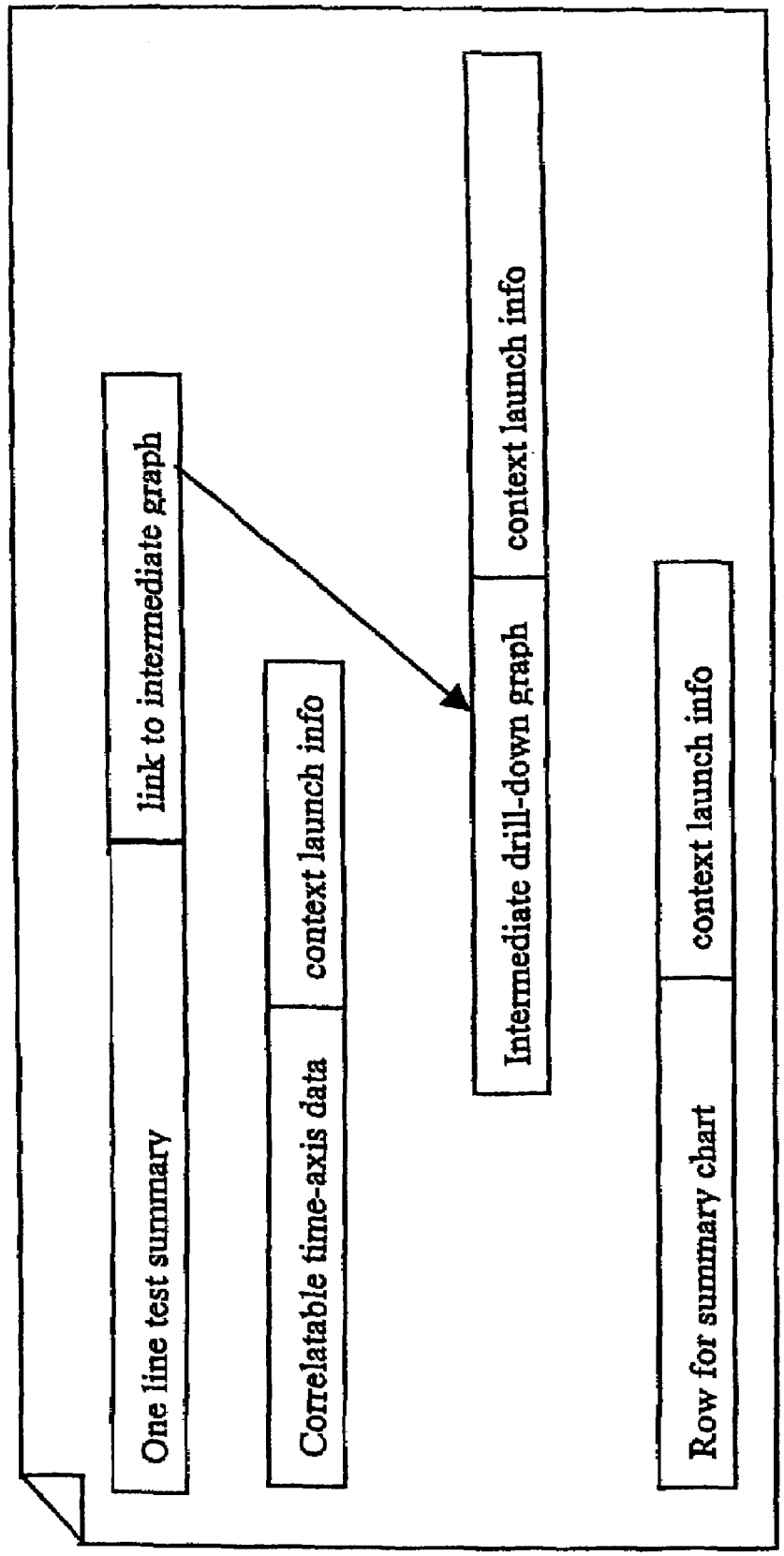
FIG. 8 illustrates an example of a complex summary document according to an embodiment of the present invention.

In FIG. 8, icons are provided which can perform "drilling." This drilling allows a user to launch the Test Reporter from one level of test results to another lever, depending on, for example, the specifics of the results desired. In other words, drilling allows a user to interactively navigate from summarized representations of test results to a more detailed representation of test results, and vice-versa. More specifically, a higher level (summary presentation level) of test results may be viewed by activating a link that allows navigation to a native user-interface, while a navigation link allows a user to navigate or drill down to a more detailed level presentation of the test results.

Additional data formats illustrating test results may be presented by the Test Reporter 400 (presentation device) according to an embodiment of the present invention by launching or drilling to other levels depending on the extent of testing conducted by the NTC 100.

Figure 9:
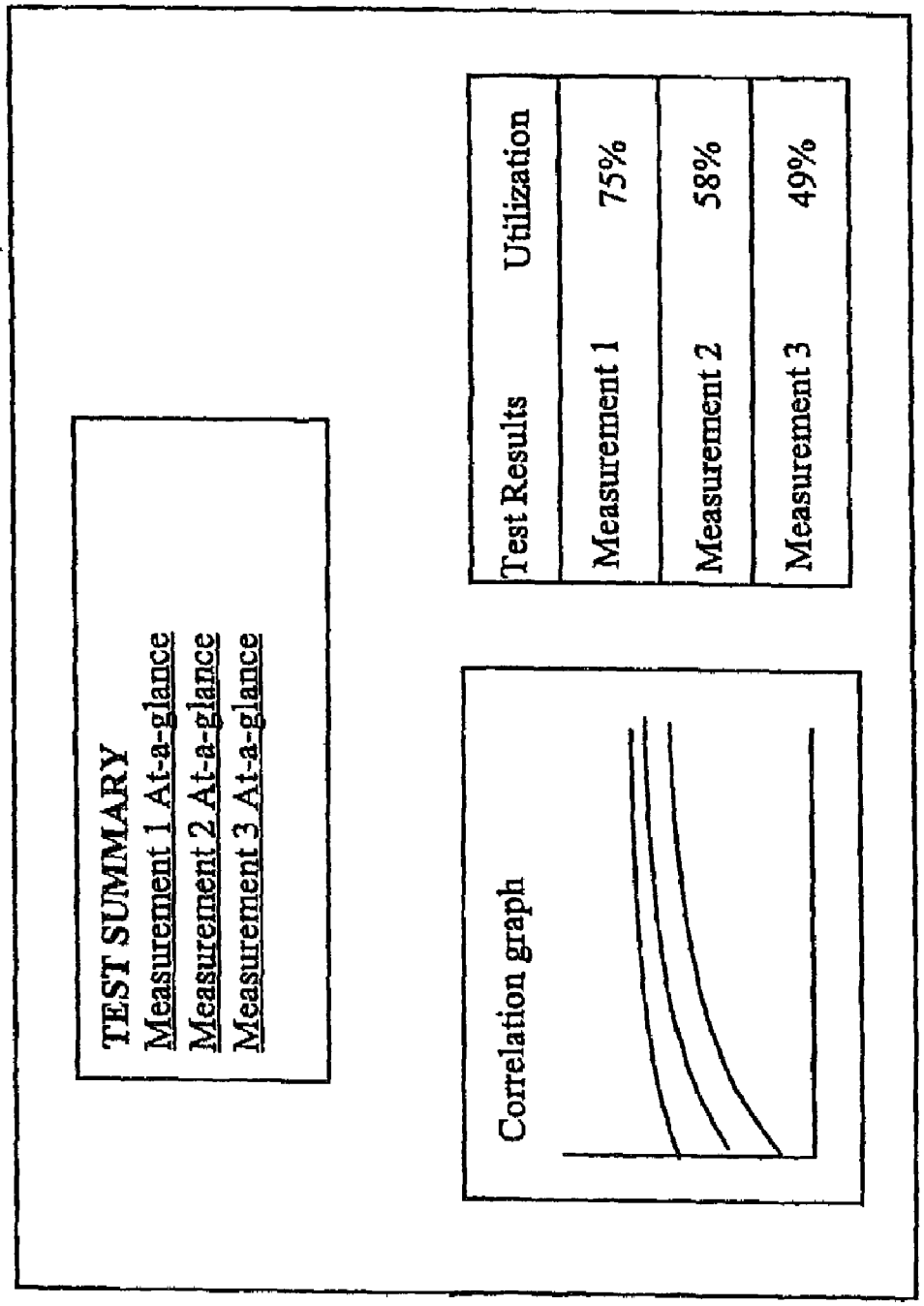
FIG. 9 illustrates an example of combining measurement results in a Test Reporter Page according to an embodiment of the present invention.

FIG. 9 illustrates an example of combining measurement results and assembling the summary page of the Test Reporter 400 (presentation device) from the individual result documents based on the example of FIG. 8.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
   a platform determining a number of heterogeneous measurements to be taken on a network, configuring settings of devices on the network from which heterogeneous data will be provided to perform the heterogeneous measurements, locking the setting-configured devices to dedicate the devices to provide the heterogeneous data, running tests to take the determined heterogeneous measurements from the locked devices, and performing an operation of summarizing the results of the tests; and
   a computer implemented data collector common to a plurality of the locked devices on the network, the data collector automatically collecting the heterogeneous measurements from the locked devices;
   wherein the summarizing operation includes normalizing the determined heterogeneous measurements on a common scale using a transform function.

2. The apparatus according to claim 1, wherein the heterogeneous measurements to be taken are measurements obtained by observing the network.

3. The apparatus according to claim 1, wherein the heterogeneous measurements to be taken are measurements of a response to a stimulus generated as part of the measurement setup.

4. The apparatus according to claim 1, wherein the defining comprises determining the devices to be implemented, to provide the heterogeneous data.

5. The apparatus according to claim 1, wherein the platform comprises a GUI to guide a user to input configuration settings for each of the devices providing heterogeneous data.

6. The apparatus according to claim 1, further comprising an API to automatically input configuration settings for each of the devices providing heterogeneous data.

7. The apparatus according to claim 1, further comprising locks to lock a particular device providing requested heterogeneous data.

8. The apparatus according to claim 1, further comprising a remote API to start running a test.

9. An apparatus comprising:
   a platform determining a number of heterogeneous measurements to be taken from a plurality of devices on a network and performing an operation of summarizing the determined heterogeneous measurements; and
   a computer implemented data collector common to the plurality of devices on the network, the data collector automatically gathering the determined heterogeneous measurements from the plurality of devices over the network,
   wherein the summarizing operation includes normalizing the determined heterogeneous measurements on a common scale using a transform function.

10. The apparatus according to claim 9, wherein the plurality of devices are network hosts providing data corresponding to a protocol implemented by the respective network host.

11. The apparatus according to claim 10, wherein the network hosts are devices that provide measurement data.

12. The apparatus according to claim 9, further comprising a test manager to manage orchestration of the measurements to be taken among the plurality of devices depending on the results desired from the measurements.

13. The apparatus according to claim 12, further comprising an input unit to input configuration settings to control the measurements to be taken.

14. The apparatus according to claim 13, wherein the input unit is a GUI receiving input from a user.

15. The apparatus according to claim 13, wherein the input unit is an API to automatically provide configuration settings.

16. An apparatus comprising:
a platform determining a number of heterogeneous measurements to be taken from a plurality of devices over a network and performing an operation of summarizing the determined heterogeneous measurements;
a data collector common to the plurality of devices on the network, the data collector automatically collecting the determined heterogeneous measurements taken from the plurality of devices over the network; and
a computer-implemented presentation device which correlates the determined heterogeneous measurements collected from the plurality of devices by the data collector, presents the correlated heterogeneous measurements on a display screen to an end user, and allows the end user to drill from a less detailed presentation to a more detailed presentation,
wherein the summarizing operation includes normalizing the determined heterogeneous measurements on a common scale using a transform function.

17. The apparatus according to claim 16, wherein the presentation device displays a summary of the normalized heterogeneous measurement results including a plurality of links to drill up or down to the desired level of detailed presentation of the measurement results.

18. A method of integrating heterogeneous measurements received from more than one data sources in a common network, comprising:
determining a number of heterogeneous measurements to be taken over the common network;
defining each of the determined heterogeneous measurements to be taken from the more than one data source;
configuring settings of the more than one data sources in which the defined heterogeneous measurements are to be taken;
locking the more than one data sources, having configured settings, in which the heterogeneous measurements are to be taken;
taking the heterogeneous measurements from the locked more than one locked data sources;
automatically collecting the taken heterogeneous measurements via a data collector common to the more than one data sources;
synchronizing the collected heterogeneous measurements;
performing an operation of summarizing the synchronized heterogeneous measurements including normalizing the synchronized heterogeneous measurements on a common scale using a transform function; and
presenting the summarized synchronized heterogeneous measurements.

19. The method according to claim 18, wherein the defining comprises manually selecting the heterogeneous measurements data to be taken through the GUI.

20. The method according to claim 18, wherein the defining comprises automatically selecting the heterogeneous measurements to be taken through an API.

21. The method according to claim 18, wherein the configuring of the settings comprises obtaining configuration settings for the heterogeneous measurements manually through a GUI.

22. The method according to claim 18, wherein the configuring of the settings comprises obtaining configuration settings for the heterogeneous measurements automatically through an API.

23. The method according to claim 18, wherein the locking of resources comprises locking the common network to the data sources providing the desired measurements.

24. The method according to claim 18, wherein the synchronizing of the heterogeneous measurements comprises placing the different measurements on a common time scale.

25. The method according to claim 24, wherein the placing of the different measurements on a common time scale comprises taking relative time differences of the measurements based on system time ticks.

26. The method according to claim 24, wherein the placing of the different measurements on a common time scale comprises distributing a common clock signal through a coaxial cable.

27. The method according to claim 18, further comprising providing a context launch for data requiring specialized presentation.

28. A method of coordinating groups of heterogeneous measurements in a common platform, comprising:
providing plural data sources, each data source containing a different type of data with respect to another data source;
measuring the different types of data from the plural data sources;
normalizing the measured results on a common scale, and wherein the normalizing comprises using a transform function to map the measured results onto a homogeneous transform space.

29. The method according to claim 28, wherein the measuring the different types of data comprises locking to a specific data source in which data is to be measured before measuring the data from that data source.

30. The method according to claim 29, wherein the measuring the different types of data further comprises synchronizing the different types of data measured on a common time scale.

31. The method according to claim 30, wherein the synchronizing the different types of data comprises taking relative time differences of the measurements based on system time ticks.

32. The method according to claim 30, wherein the synchronizing the different types of data comprises distributing a common clock signal through a coaxial cable to the plurality of data sources.

33. The method according to claim 30, wherein the synchronizing the different types of data comprises time stamping the data measured.

34. The method according to claim 28, wherein the normalizing comprises applying the following formula to the data measured:

$y=f(x)$ where $y=3.0$ where $x>=C\max$ $y=2.0+(x-Try)/(C\max-Tyr)$ where $C\max>=Tyr$ $y=1.0+(x-Tgy)/(Tyr-Tgy)$ where $Tyr>=Tgy$ $y=x/(Tgy-Cmin)$ where $Tgy>x>=Cmin$ $y=0.0$ where $x<Cmin$ where: Cmin is a minimum constraint value;
Cmax is a maximum constraint value;
Tyr is the second threshold expressed in the same units as the x value; and
Tgy is the first threshold expressed in the same units as the x value.

35. The method according to claim 34, wherein the formula is applied to negative data.

36. The method according to claim 28, wherein the normalizing comprises using a mathematical transform function to transform at least two heterogeneous scalar measurement data each into a homogeneous mathematical transform space; and displaying at least one of the two transformed heterogeneous scalar measurement data.

37. The method according to claim 28, wherein the mapping of the measured results onto a homogeneous transform space comprises using threshold values to place the measured results in a summary form.

38. An apparatus comprising:
a platform determining a number of measurements to be taken from a plurality of different devices on a network and performing an operation of summarizing the determined heterogeneous measurements;
a computer implemented data collector common to the plurality of different devices on the network, the computer implemented data collector automatically collecting measurements from the plurality of the different devices; and
a common framework to correlate the measurements collected by the data collector, at least two of the devices providing data of a different type by synchronizing the measurements obtained from the different devices,
wherein the summarizing operation includes normalizing the determined heterogeneous measurements on a common scale using a transform function.

39. The apparatus according to claim 38, wherein the synchronizing the measurements obtained comprises a unit to take relative time differences based upon system time ticks to time stamp the measurements obtained.

40. A network troubleshooting system comprising:
at least two data sources, each data source providing data of a different type with respect to another data source to be measured;
a data source manager providing management of how the different types of data are to be measured via a platform determining a number of measurements to be taken from a plurality of devices on a network;
a data collector common to the plurality of devices on the network, providing information necessary for the network troubleshooting system to measure the different types of data provided by the at least two data sources;
a database to store the determined measurements taken;
a test manager to manage performance of the stored measurements on the different types of data provided by the at least two data sources; and
means for performing an operation of summarizing the stored measurements,
wherein the summarizing operation includes normalizing the stored measurements on a common scale using a transform function.

41. The network troubleshooting system according to claim 40, wherein the different types of data measured are synchronized on a common time scale.

42. The network troubleshooting system according to claim 41, wherein the different types of data are time synchronized by time stamping, providing timing based on system time ticks, having a common clock distributed to each of said at least two data sources, comparing that data to a system clock, or using a GPS receiver.

43. The network troubleshooting system according to claim 40, wherein the at least two data sources comprise a router, a voice tester, a network analyzer or a network probe.

44. An apparatus comprising:
a platform determining a number of heterogeneous measurements to be taken from a plurality of devices on a network;
a data collector common to the plurality of devices on the network, the data collector automatically collecting the determined heterogeneous measurements from the plurality of the devices; and
a computer-implemented presentation device which correlates the determined heterogeneous measurements collected from the plurality of the devices on the network and aggregates the correlated measurements on a common scale using a transform function for a summarized presentation of the heterogeneous measurements.

45. The apparatus according to claim 44, further comprising a drilling unit to allow an end user to drill from the summarized presentation of the heterogeneous measurements to a more detailed presentation of the heterogeneous measurements.

46. A method of coordinating groups of heterogeneous measurements in a common platform, comprising:
providing plural data sources, each data source containing a different type of data with respect to another data source;
measuring the different types of data from the plural data sources; and
normalizing the measured results on a common scale,
wherein the normalizing comprises applying the following formula to the data measured:

$y=f(x)$ where $y=3.0$ where $x>=Cmax$ $y=2.0+(x-Try)/(Cmax-Tyr)$ where $Cmax>=Tyr$ $y=1.0+(x-Tgy)/(Tyr-Tgy)$ where $Tyr>=Tgy$ $y=x/(Tgy-Cmin)$ where $Tgy>x>=Cmin$ $y=0.0$ where $x>Cmin$ where: Cmin is a minimum constraint value;
Cmax is a maximum constraint value;
Tyr is the second threshold expressed in the same units as the x value; and
Tgy is the first threshold expressed in the same units as the x value.

47. The method according to claim 46, wherein the formula is applied to negative data.

* * * * *

UNITED STATES PATENT AND TRADEMARK OFFICE
CERTIFICATE OF CORRECTION

PATENT NO. : 7,231,555 B2 Page 1 of 1
APPLICATION NO. : 10/225126
DATED : June 12, 2007
INVENTOR(S) : Barnard et al.

It is certified that error appears in the above-identified patent and that said Letters Patent is hereby corrected as shown below:

In column 12, lines 33-34, in Claim 4, delete "implemented," and insert -- implemented --, therefor.

In column 14, line 65, in Claim 34, delete "-Try" and insert -- -Tyr --, therefor.

In column 16, line 47 (Approx.), in Claim 46, delete "-Try" and insert -- -Tyr --, therefor.

In column 16, line 53 (Approx.), in Claim 46, delete "x>" and insert -- x< --, therefor.

Signed and Sealed this

Twenty-third Day of October, 2007

JON W. DUDAS
*Director of the United States Patent and Trademark Office*